(12) United States Patent
Challapali et al.

(10) Patent No.: US 10,348,939 B2
(45) Date of Patent: Jul. 9, 2019

(54) DETECTION OF THE PRESENCE OF TELEVISION SIGNALS EMBEDDED IN NOISE USING CYCLOSTATIONARY TOOLBOX

(71) Applicant: KONINKLIJKE PHILIPS N.V., Eindhoven (NL)

(72) Inventors: Kiran Srinivas Challapali, New City, NY (US); Bin Dong, New York, NY (US); Dagnachew Birru, Yorktown Heights, NY (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 6 days.

(21) Appl. No.: 15/484,414

(22) Filed: Apr. 11, 2017

(65) Prior Publication Data

US 2017/0223232 A1    Aug. 3, 2017

Related U.S. Application Data

(63) Continuation of application No. 12/160,445, filed as application No. PCT/IB2007/050146 on Jan. 16, 2007, now Pat. No. 9,654,673.

(Continued)

(51) Int. Cl.
*H04N 17/00* (2006.01)
*H04N 17/02* (2006.01)
(Continued)

(52) U.S. Cl.
CPC .............. *H04N 5/08* (2013.01); *H04N 5/21* (2013.01); *H04N 5/4401* (2013.01); *H04N 5/46* (2013.01); *H04N 21/42607* (2013.01)

(58) Field of Classification Search
None
See application file for complete search history.

(56) References Cited

U.S. PATENT DOCUMENTS

| 3,812,432 A | * | 5/1974 | Hanson | ................... H04Q 1/45 327/37 |
| 4,059,730 A | | 11/1977 | Messerschmitt | |

(Continued)

FOREIGN PATENT DOCUMENTS

| GB | 2234077 A1 | 1/1991 |
| JP | 2002221546 A | 8/2002 |

(Continued)

*Primary Examiner* — William J Kim
(74) *Attorney, Agent, or Firm* — Larry Liberchuk

(57) ABSTRACT

Detecting the presence of a television signal embedded in a received signal including the television signal and noise. Either first-order or second order cyclostationary property of the signals may be used for their detection. When the first-order cyclostationary property is used, the received signal is upsampled by a factor of N, a synchronous averaging of a set of M segments of the upsampled received signal is performed, an autocorrelation of the signal is performed; and the presence of peaks in the output of the autocorrelation function is detected. When the second order cyclostationary property of the signal is used, the received signal is delayed by a fixed delay (symbol time), the received signal is multiplied with the delayed version, and a tone (single frequency) in the output is detected.

6 Claims, 6 Drawing Sheets

Related U.S. Application Data

(60) Provisional application No. 60/816,200, filed on Jun. 23, 2006, provisional application No. 60/759,521, filed on Jan. 17, 2006.

(51) Int. Cl.
*H04L 7/00* (2006.01)
*H04N 5/08* (2006.01)
*H04N 5/21* (2006.01)
*H04N 5/44* (2011.01)
*H04N 5/46* (2006.01)
*H04N 21/426* (2011.01)

(56) References Cited

U.S. PATENT DOCUMENTS

| | | | | |
|---|---|---|---|---|
| 5,157,688 A | * | 10/1992 | Dell-Imagine | H04B 1/707 375/130 |
| 5,623,319 A | | 4/1997 | Hill | |
| 5,644,126 A | * | 7/1997 | Ogawa | G01D 5/341 250/222.1 |
| 5,694,517 A | * | 12/1997 | Sugino | G10L 25/78 379/80 |
| 5,715,280 A | * | 2/1998 | Sandberg | H04L 5/023 375/260 |
| 6,122,652 A | * | 9/2000 | Jin | H04Q 1/45 708/312 |
| 6,426,977 B1 | * | 7/2002 | Lee | H04K 1/00 375/259 |
| 6,490,010 B1 | | 12/2002 | Shibuya | |
| 6,525,255 B1 | * | 2/2003 | Funaki | G10H 3/125 84/616 |
| 6,765,950 B1 | * | 7/2004 | Nuytkens | H04B 1/707 348/E7.024 |
| 6,826,350 B1 | | 11/2004 | Kashino | |
| 7,096,079 B2 | * | 8/2006 | Matsuura | A63F 13/10 463/36 |
| 7,142,617 B2 | | 11/2006 | Mohan | H04L 27/001 375/323 |
| 7,675,979 B1 | * | 3/2010 | Yu | H04B 3/54 375/219 |
| 2001/0055311 A1 | * | 12/2001 | Trachewsky | H04L 1/0003 370/445 |
| 2002/0030637 A1 | * | 3/2002 | Mann | G02B 27/017 345/8 |
| 2002/0097860 A1 | * | 7/2002 | Soman | H04Q 1/4575 379/386 |
| 2002/0191705 A1 | * | 12/2002 | Melsa | H04L 27/2624 375/295 |
| 2003/0081660 A1 | * | 5/2003 | King | G01S 19/29 375/150 |
| 2003/0112370 A1 | | 6/2003 | Long | |
| 2003/0142837 A1 | * | 7/2003 | Kondo | G05B 13/0265 381/94.1 |
| 2004/0092281 A1 | * | 5/2004 | Burchfiel | H04B 7/0408 455/522 |
| 2005/0111691 A1 | * | 5/2005 | Larkin | G06F 17/15 382/100 |
| 2005/0143008 A1 | | 6/2005 | Bailey | |
| 2005/0271133 A1 | | 12/2005 | Shai | |
| 2006/0075884 A1 | * | 4/2006 | Streitenberger | G10H 3/125 84/616 |
| 2006/0197872 A1 | * | 9/2006 | Chen | H03M 1/1028 348/572 |
| 2006/0274868 A1 | * | 12/2006 | Chen | H04L 27/262 375/347 |
| 2006/0277039 A1 | * | 12/2006 | Vos | G10L 19/0208 704/219 |
| 2006/0294573 A1 | * | 12/2006 | Rogers | H04N 7/17309 725/147 |
| 2007/0071362 A1 | * | 3/2007 | Milanfar | G06K 9/20 382/299 |
| 2007/0086597 A1 | * | 4/2007 | Kino | H04S 7/301 381/59 |
| 2007/0139619 A1 | * | 6/2007 | DeCusatis | G03B 35/00 353/7 |
| 2007/0174891 A1 | | 7/2007 | Hidenori | |
| 2008/0181291 A1 | * | 7/2008 | Zhou | H04B 7/1858 375/227 |

FOREIGN PATENT DOCUMENTS

| | | |
|---|---|---|
| TW | 321817 B | 12/1997 |
| WO | WO03090037 A2 | 10/2003 |
| WO | WO2004008706 A2 | 1/2004 |
| WO | WO2004055718 A1 | 7/2004 |

\* cited by examiner

US 10,348,939 B2

DETECTION OF THE PRESENCE OF TELEVISION SIGNALS EMBEDDED IN NOISE USING CYCLOSTATIONARY TOOLBOX

This invention is related to the field of Cognitive Radios and more specifically to detecting the presence or absence of a television signal for opportunistic use by Cognitive Radios.

Spectrum agile radios (also known as Cognitive Radios) represent an emerging approach for wireless communications wherein parts of frequency spectrum are used on an on-needed basis. Cognitive Radios adjust their transmission characteristics based on the external environment. This means that if a part of the spectrum is allocated to a licensed user and is not being used in a given place and time, (FCC rules permitting) agile radios can use this spectrum. The agile radio devices generally ascertain that no licensed device exists so that their transmissions do not cause harmful interference to licensed devices.

Cognitive radios may be used in short-range wireless situations, such as in-hospital patient monitoring or long-range wireless situations, such as wireless last-mile access. Note that television receivers that participate in a television service do not transmit. Therefore their presence is hard to detect. However, TV receivers need a minimum level of signal from a TV broadcast station to operate. Therefore techniques that can detect the presence of TV signals deeply embedded in noise are a critical part of agile/cognitive radios.

Hence, there is a need in the industry for the development of methods for identifying TV signals deeply embedded in noise.

A method, device and computer product for detecting the presence of a television signal embedded in a received signal including the television signal and noise is disclosed. The method comprising the steps of determining a peak energy of the received television signal and determining the television signal periodicity based on the determined peak energy. In one aspect of the invention the step of determining the peak energy comprises the steps of upsampling the received signal by a factor of N, performing a synchronous averaging of a set of M segments of the upsampled received signal, performing an autocorrelation of the signal, and detecting the presence of peaks in the output of the autocorrelation function. In another aspect of the invention, the method comprises the steps of upsample the desired signal by a factor of N, performing delay-multiply of the signal, performing a tone analysis and detecting a single signal in the output of the tone analysis.

Figure 1A:
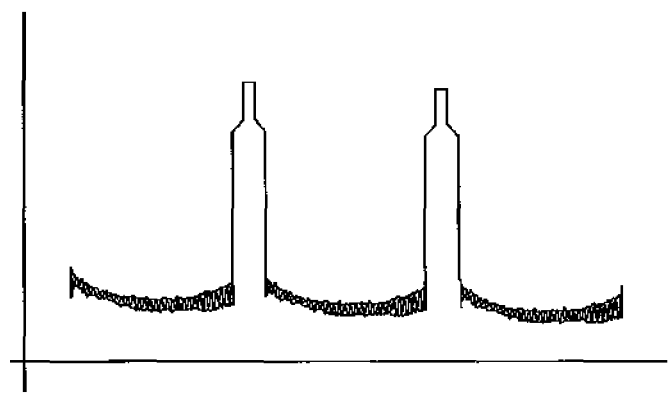
FIGS. 1A and 1B illustrate a time representation and a frequency representation of a conventional analog TV signal, respectively.

It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have been used to identify similar elements.

Figure 1B:
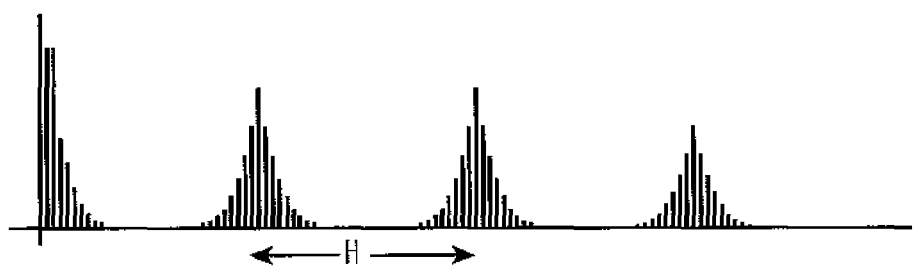

Traditionally, a cyclostationary toolbox is used for detecting signals that are embedded in noise. A cyclostationary property arises in a signal if the signal has periodic mean and a periodic variance values (higher order cyclostationarity, say fourth order, may also be exhibited). FIGS. 1A and 1B illustrate the periodic nature of a conventional analog TV signal in the time and frequency domains, respectively. Referring to FIG. 1A, a conventional TV signal possess a periodic time property (H), wherein a "horizontal sync" signal is generated after each data frame (458 lines). The horizontal sync signal is repeated 30 times per second. FIG. 1B illustrates the periodic signal in the frequency domain, wherein the signal energy is clustered in frequencies separated by the line period, presented as "H." With reference to FIGS. 1A and 1B, it can be seen that the spectrum of a conventional TV signal has a high degree of self-correlation and, hence, possess a cyclostationary property.

Figure 2A:
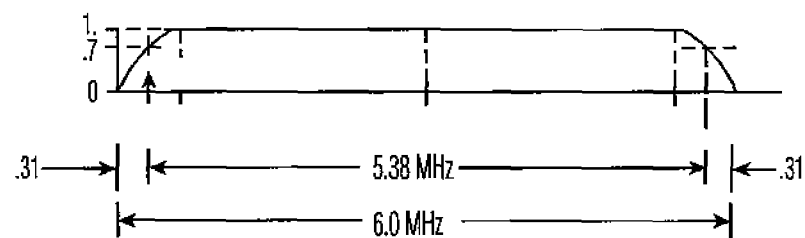
FIGS. 2A and 2B illustrate a frequency representation and a frame structure of an exemplary digital TV (ATSC) signal.
Figure 2B:
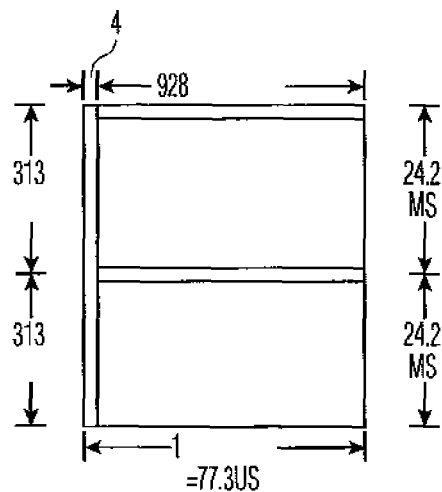

FIG. 2A and 2B illustrate a similar cyclostationary property for digital signals. With regard to FIG. 2A, the spectrum of a digital TV signal (IEEE ATSC 53) shown to include a suppressed carrier in a predetermined portion of the frequency spectrum and the overall band is similarly fixed. FIG. 2B illustrates the repeated frame structure of the IEEE ATSC 53 digital signal wherein 313 segments are transmitted in a 24.2 millisecond frame.

Figure 3A:
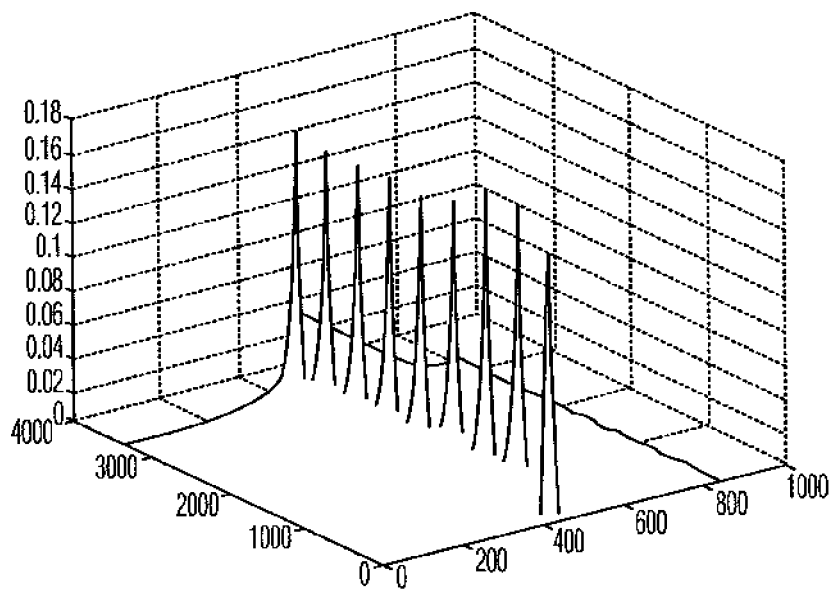
FIGS. 3A and 3B illustrate a cyclic correlation and spectral correlation density of conventional NTSC (analog) TV signals.
Figure 3B:
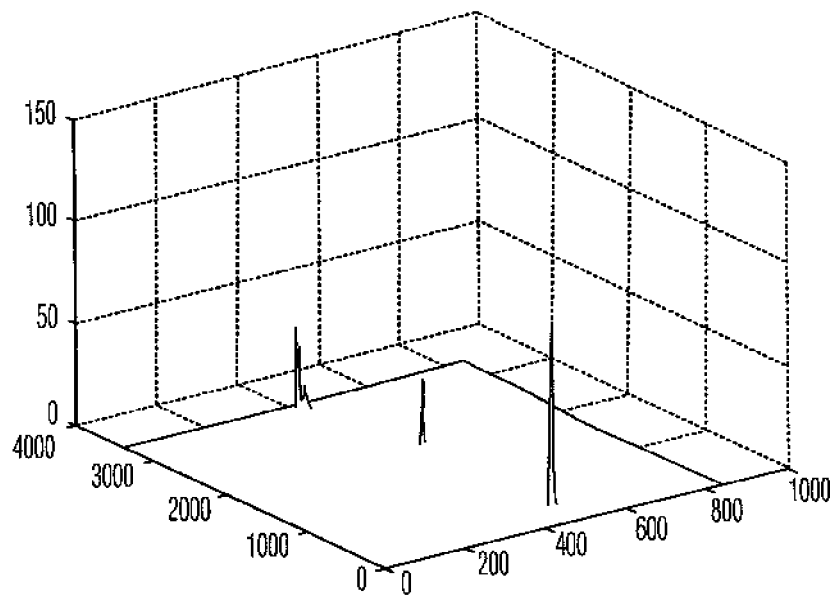

For analog signals, the cyclic autocorrelation function ($R_x^\alpha(\tau)$), and cyclic spectral density function ($S_x^\alpha(f)$), (equations 1 and 2), are shown in FIGS. 3A and 3B, respectively. These functions may be determined as:

$$\hat{R}_x^\alpha(\tau) \equiv \lim_{T \to \infty} \frac{1}{T} \int_{-T/2}^{T/2} x\left(t + \frac{\tau}{2}\right) x\left(t - \frac{\tau}{2}\right) e^{-i2\pi\alpha t} dt \quad (1)$$

$$\hat{S}_x^\alpha(f) = \int_{-\infty}^{\infty} \hat{R}_x^\alpha(\tau) e^{-i2\pi f \tau} d\tau \quad (2)$$

where $R_x^\alpha(\tau)$ is the autocorrelation function of the received signal (x);

$S_x^\alpha(f)$ is the Fourier transform of the cyclic autocorrelation function; and $\tau$ is the lag between two signals.

Most existing methods propose the use of delay-multiply to detect the presence of cyclostationary (periodic variance) signals. For digital signals the output SNR ($O_{snr}$) for a delay-multiply circuit is given by $$O_{snr} = \gamma N_s (I_{snr})^2 \quad (3)$$

where $O_{snr}$ is the output SNR;

$N_s$ is the integration time or number of FFT points; and $\gamma$ changes over different detection schemes.

Figure 3C:
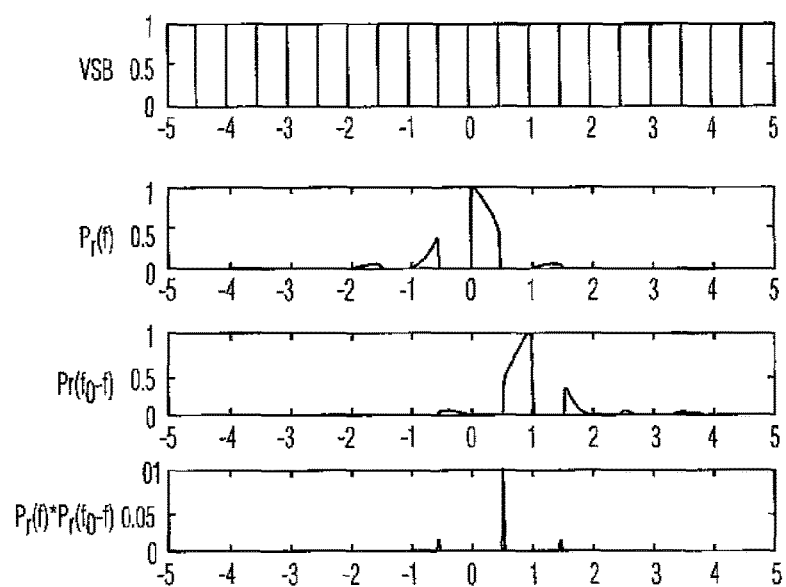
FIG. 3C illustrates a method for determining an output signal to noise (SNR) ratio for obtaining a TV signal.

However, $\gamma$ is small and is equal to typically 0.0012. FIG. 3C illustrates a method for determining the value of $\gamma$.

In accordance with the principles of the invention, synchronous averaging (exploiting first-order cyclostationary property) or delay-multiply followed by tone-detection (exploiting second-order cyclostationary property) based detection signals is used to determine the hidden periodicity of a received signal containing a television signal and noise and to further detect the presence of the received analog and/or digital television signals. More specifically, the method of the present invention, exploiting a first-order cyclostationary property, may be summarized as comprising the steps of:

a. upsample the desired signal by a factor of N;
   b. performing synchronous averaging of a set of M segments;
   c. performing an autocorrelation of the signal; and
   d. detecting the presence of peaks in the output of the autocorrelation.

Based on an estimate of the periodicity of "H" (as shown in FIG. 1A) at the receiver, (as the clock recovery is not fully determined, a search is conducted over B adjacent frequency bins), the received input signal (TV signal and noise) may be segmented and M such segments are averaged together. B is chosen based on the accuracy of the clock at the receiver, that is, if the clock is very accurate, B is small, whereas, if the clock is less accurate, B is a larger number. Since "H" is large, errors in estimating the clock value do not have a significant impact on detection (in addition, searching over B adjacent frequency bins partially mitigates this problem). Following this, matched filter type detection is used to detect the presence of the sync pattern in the analog TV signal.

In a second aspect, the method of the present invention, exploiting a second-order cyclostationary property, may be summarized as comprising the steps of (conducted over B adjacent frequency bins):

a. upsample the desired signal by a factor of N;
   b. performing delay-multiplier of the signal;
   c. performing a tone analysis; and
   d. detecting a single signal in the output of the tone analysis.

Figure 4:
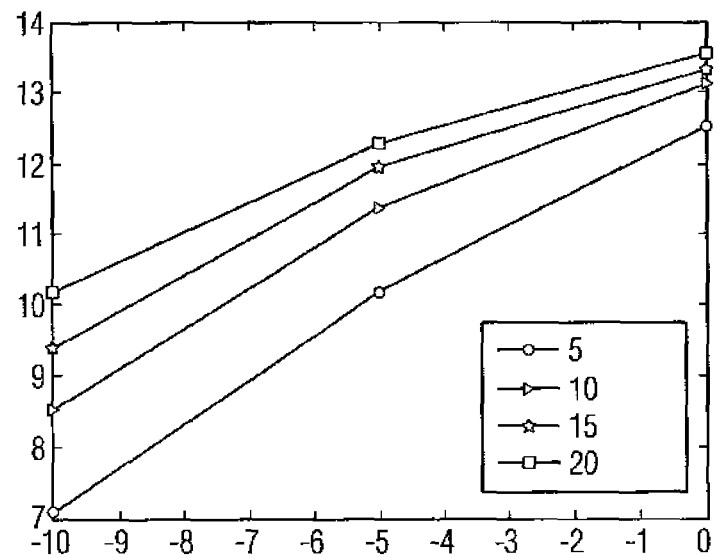
FIG. 4 illustrates results of detection of a conventional analog NTSC signal in accordance with the principles of the present invention.

FIG. 4 illustrates the results of synchronous averaging based cyclostationary detection of a conventional NTSC analog TV signal for segments of size M=5, 10, 15 and 20 in accordance with the principles of the invention. Upsample factor N is typically taken as several orders of magnitudes greater than the analog TV sample rate of 13.5 Mhz and the digital TV sample rate of 10.75 Mega symbols/second.

As is illustrated, as the number of segments (M) selected increases the output SNR increases for a known input SNR. That is as the number of segments used increases, the noise in the received signal is averaged over a greater number of segments allowing for a greater signal-to-noise ratio and a better chance of detecting the hidden periodicity in the received signal. Accordingly, M as a known multiple of an estimate of the periodicity (H) of the expected signal.

Figure 5:
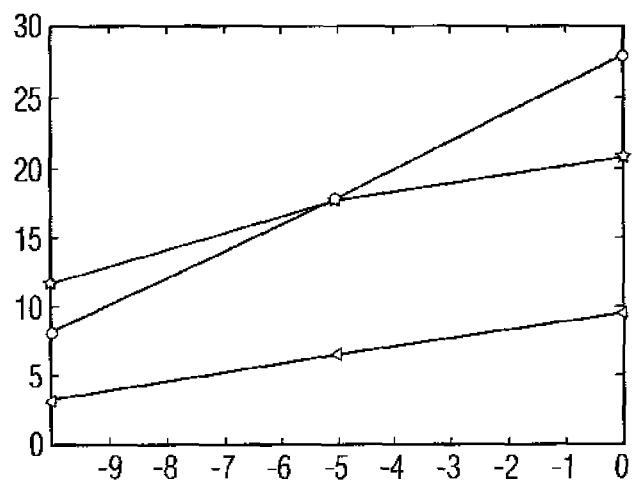
FIG. 5 illustrates results of detection of an exemplary ATSC (digital) TV signal in accordance with the principles of the present invention.
Figure 5:

FIG. 5 illustrates the results of delay-multiply and synchronous averaging based detection in accordance with the principles of the invention of an exemplary digital TV signal. In this illustrated presentation, correlation-1 represents the autocorrelation of the signal followed by threshold detection for the detection of the field sync signal (i.e., the horizon axis in FIG. 2A) and correlation-2 represents the synchronous averaging, as discussed above, as applied to ATSC (digital) signals for the detection of segment sync (i.e., the vertical axis in FIG. 2A).

As would be recognized, the processing shown herein may be executed by software and/or hardware code operating in a computer or processing system. The system may include a programmable memory, i.e., PROM, RAM, FLASH, etc., that stores code that provides necessary instructions to the processing system. The code may pre-stored in the memory or may be downloaded via one or more computer-readable media or over a network. In another aspect, the code may be hardware code loaded in a FPGA or ASIC that provides necessary instructions to the processing system. The processing system may further receive inputs from one or more sensors that provide indications of the movement of the portable device.

Figure 6:
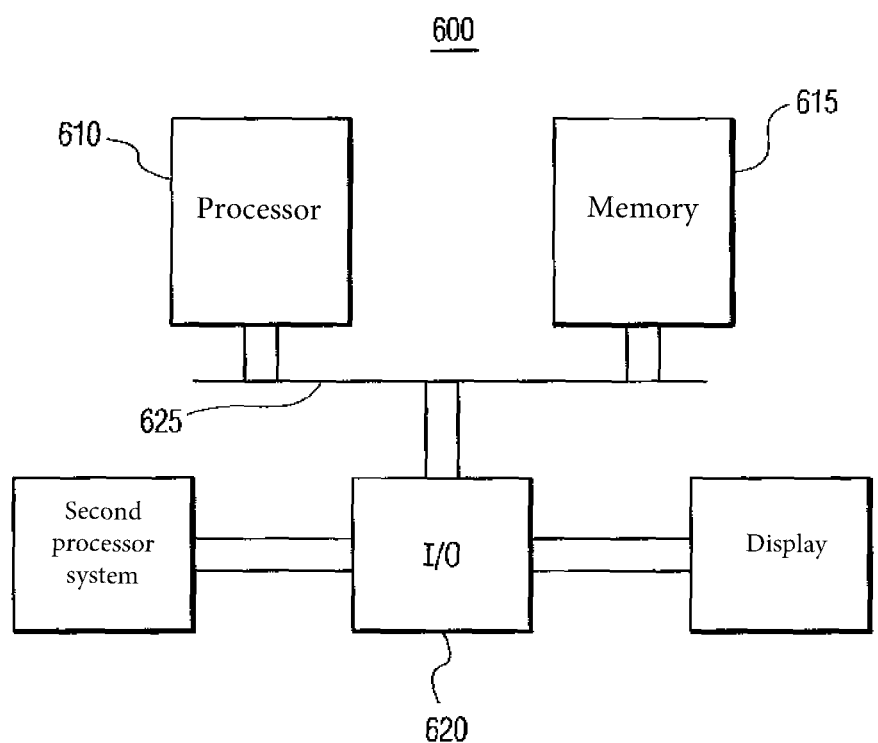
FIG. 6 illustrates a system for performing the processing shown herein.

FIG. 6 illustrates a conventional processor system 600 for executing the processing shown herein. Processor system 600 includes a processor 610 in communication a memory 615 and an input/output device 620 over a communication bus 625. Memory 615 may include instructions or computer-code which when executed by processor 610 perform the processing described herein. Input/output device 620 provides a means for processor 610 and/or memory 615 to receive information from or transmit information to a second processing system or information display systems. Although not shown, it would be recognized that information may be transmitted over one or more networks between display and I/O device 620 or second processor system and I/O device 620. For example, the computer code may be transmitted to the memory over a network through I/O device 620.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. It is expressly intended that all combinations of those elements that perform substantially the same function in substantially the same way to achieve the same results are within the scope of the invention. Substitutions of elements from one described embodiment to another are also fully intended and contemplated.

The invention claimed is:

1. A method for detecting a television signal deeply embedded in noise in a spectrum agile radio to ascertain that an unlicensed user does not interfere with a licensed user, the method comprising:
   receiving, over a frequency spectrum allocated to the licensed user, a signal that comprises the television signal and noise, the television signal exhibiting cyclostationary properties;
   determining a peak energy of the signal by
     upsampling the signal by a factor of N;
     performing delay-multiplier of the signal;
     performing a tone analysis of the signal; and
     detecting a single signal in an output of the tone analysis; and
   determining a periodicity of the television signal based on the determined peak energy.

2. The method as recited in claim 1, wherein the value of N is at least one magnitude greater than a sampling rate of the television signal, and a search is conducted over B adjacent frequency bins.

3. A device for detecting a television signal deeply embedded in noise in a spectrum agile radio to ascertain that an unlicensed user does not interfere with a licensed user, the device comprising:
   a processor in communication with a memory, the processor configured to:
     receive, over a frequency spectrum allocated to the licensed user, a signal that comprises the television signal and noise, the television signal exhibiting cyclostationary properties;
     determine a peak energy of the received signal by upsampling the signal by a factor of N;
performing delay-multiplier of the signal;
performing a tone analysis of the signal; and
detecting a single signal in an output of the tone analysis; and determine a periodicity of the television signal based on the determined peak energy.

4. The device as recited in claim 3, wherein the value of N is at least one magnitude greater than a sampling rate of the television signal, and a search is conducted over B adjacent frequency bins.

5. A non-transitory computer readable medium providing instructions to a processing system for detecting a television signal deeply embedded in noise in a spectrum agile radio to ascertain that an unlicensed user does not interfere with a licensed user, the instructions causing the processing system to:

receive, over a frequency spectrum allocated to the licensed user, a signal that comprises the television signal and noise, the television signal exhibiting cyclostationary properties;

determine a peak energy of the received signal by
upsampling the signal by a factor of N;
performing delay-multiplier of the signal;
performing a tone analysis of the signal; and
detecting a single signal in an output of the tone analysis; and determine a periodicity of the television signal based on the determined peak energy.

6. The computer readable medium as recited in claim 5, wherein the value of N is at least one magnitude greater than a sampling rate of the television signal, and a search is conducted over B adjacent frequency bins.

* * * * *